(12) United States Patent  (10) Patent No.: US 6,476,938 B1
Soga  (45) Date of Patent: Nov. 5, 2002

(54) PRINT CONTROL SYSTEM AND METHOD

(75) Inventor: Kazuhiro Soga, Kawasaki (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 0 days.

(21) Appl. No.: 08/943,201

(22) Filed: Oct. 3, 1997

(30) Foreign Application Priority Data

Oct. 18, 1996 (JP) .............................................. 8-276419

(51) Int. Cl.[7] .................................................. H04N 1/32
(52) U.S. Cl. ...................... 358/442; 358/1.13; 358/1.15; 358/442; 358/468; 382/276; 382/299; 709/226; 709/230
(58) Field of Search ................................. 395/112, 114, 395/115, 231, 206, 261, 266; 358/401, 442, 448, 501, 1.13, 1.15, 1.16, 1.17; 382/276

(56) References Cited

U.S. PATENT DOCUMENTS

| | | | | |
|---|---|---|---|---|
| 4,991,114 A | * | 2/1991 | Kawamura et al. | 395/114 |
| 5,502,804 A | * | 3/1996 | Butterfield et al. | 707/502 |
| 5,633,992 A | * | 5/1997 | Gyllenskog | 395/114 |
| 5,710,635 A | * | 1/1998 | Webster et al. | 358/296 |
| 5,737,503 A | * | 4/1998 | Mitani | 395/115 |
| 5,825,988 A | * | 10/1998 | Collard et al. | 395/112 |
| 6,213,652 B1 | * | 4/2001 | Suzuki et al. | 358/1.15 |

OTHER PUBLICATIONS

"PostScript Language Reference Manual" Second Edition Section 4.11.2, Adobe Systems Incorporated, pp. 226–239.
"Document Printing Application" ISO/IEC 10175–1, May 1995, pp. 20–29, 138–179.

* cited by examiner

Primary Examiner—Jose L. Couso
Assistant Examiner—Gregory Desire
(74) Attorney, Agent, or Firm—Oliff & Berridge, PLC

(57) ABSTRACT

A print control system allows a user to specify the internal state of a PDL (Page Description Language) interpreter using data coded in a format other than the PDL format the PDL interpreter can process. A client unit sends a job, containing existing PDL data, to which DPA (Document Printing Application) data specifying a new print specification is added, to a print server. The print server extracts the DPA data from the job and sends the data to a DPA conversion module. The DPA conversion module converts the DPA data to a PDL description and sends the converted result to the PDL interpreter. The PDL interpreter interprets the converted result and sets up the internal state. When the PDL interpreter completes the interpretation of the PDL description, a controller extracts PDL data from the job and sends the data to the PDL interpreter. As a result, the PDL data of the job is processed in the PDL interpreter according to the DPA specification.

13 Claims, 6 Drawing Sheets

Fig. 3 (a)

|  | RESOLUTION | PAGE SIZE |
|---|---|---|
| DPA SPECIFICATION | 400dpi | A4 |

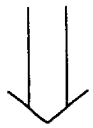

```
<<
    /PageSize [595 842]        % Specify a4 for page size
    /HWResolution [400 400]    % Specify 400dpi for resolution
>> setpagedevice
 / setpagedevice / pop load def   % Nullify set pagedevice
```

Fig. 3 (b)

| | OUTPUT CHARACTER STRING | CONTENTS |
|---|---|---|
| Fig. 4 (a) | %% [Page i] %% | ---- No error (normal) |
| Fig. 4 (b) | %% [Error:limitcheck] %% | ---- PDLError |
| Fig. 4 (c) | %% [Error:undefined] %% | ---- PDLError |
| Fig. 4 (d) | %% [Error:interrupt] %% | ---- InterruptError |

PRINT CONTROL SYSTEM AND METHOD

BACKGROUND OF THE INVENTION

1. Field of the Invention

The present invention relates to a print control system and a method, and more particularly to a technology for setting up the internal state of a PDL (Page Description Language) processor used in the print control system. The PDL processor is a processor which processes print data coded in a specific PDL for generating the page image of each page.

2. Description of the Related Art

In a network print system, a page description language (PDL) such as PostScript (trademark of Adobe Systems Incorporated, U.S.) is used to format print data sent from a client unit, usually a computer, to a print server. In such a print system, a document edited by a document editing application on the client unit is converted to PDL-format print data by a print driver contained in the client unit for transmission to the print server. The print server interprets the PDL-coded document, generates a page image of each page in bit map memory, and sends each page image to a printer for printing on paper.

The print server interprets PDL-coded print data through a module called a PDL interpreter and generates page image data. The PDL interpreter holds and manages various types of image generation data (such as graphic status) or print specification data (such as attributes) as its internal state data, and changes the internal state data according to the interpretation result of received print data. The PDL interpreter, in turn, generates page image data according to the internal state data. The PDL interpreter is designed to interpret only a specific PDL. Specifying or changing the internal state data of the PDL interpreter requires a user to code data in the PDL and to enter coded data (PDL data) into the PDL interpreter.

Conventionally, a PDL has been used as a transfer format of a document sent from a client unit to the print server. PDL-formatted print data, once printed, is usually discarded. Recently, however, printed PDL-formatted print data is saved in a file for later processing and printing.

When a PDL file is re-used, a print specification different from the previous specification is sometimes desired. For example, the user wants to change the font or the print attributes such as paper size or single/double sided printing.

Recently, the International Organizations for Standardization (ISO) defined a document printing application protocol called DPA (Document Printing Application: ISO/IEC10175). Some printer drivers create print specification data according to the DPA. On a client unit on which such a printer driver is used, a DPA-coded print specification, which specifies changes to an existing PDL file, may be added to a PDL file for transmission to the print server.

A print specification may include data on the internal state of the PDL interpreter. As described above, the internal state of the PDL interpreter can only be changed internally by having the PDL interpreter interpret PDL-coded data, and can not be changed externally according to DPA data.

This applies not only to the DPA, but to data which cannot be interpreted by the PDL interpreter. To change the internal state of the PDL interpreter, only the corresponding PDL must be used.

Thus, a conventional print server can not set or change the internal state of its PDL interpreter when internal state specification data which is not described in the PDL associated with that print server is input.

SUMMARY OF THE INVENTION

The present invention seeks to solve the problems associated with the problem described above. It is an object of the present invention to provide a system and a method which allow a print control system with a PDL processing module, such as a PDL interpreter, to process internal state specification data described in a format which the PDL processing module cannot interpret, and which sets up the internal state of the PDL processing module according to the data.

To achieve the above object, one aspect of the present invention is a print control system which comprises a PDL processing module which processes print data described in a predetermined PDL (page description language) to change it own internal state; a control module which extracts state specification data from job data entered from a client unit, the state specification data specifying the internal state of the PDL processing module and being described in a specific data format other than the predetermined PDL format; and a conversion module which converts the state specification data, extracted by the control module, to be expressed in the predetermined PDL for transmission to the PDL processing module, wherein the PDL processing module processes the conversion result of the state specification data received from the conversion module to specify its own internal state.

In this configuration, the control module extracts state specification data, specifying the internal state of the PDL processing module, from job data received from the client unit. The conversion module converts the state specification data to description expressed in the predetermined page description language (PDL). The conversion module then sends conversion result to the PDL processing module. The PDL processing module processes the state specification data, which has been converted to PDL, to reflect it on its own internal state.

This configuration allows a user of the client unit to use non-PDL (such as DPA) state specification data to specify the internal state of the PDL processing module.

In the above configuration, a user of the client unit can send PDL print data containing non-PDL state specification data to set up the internal state of the PDL processing module. The non-PDL state specification data sets up the internal state of the PDL processing module and, after that, the PDL processing module processes the print data. This configuration allows the user to send existing PDL print data as well as a print specification, coded in a format other than the PDL, to specify the print specification for the print data.

In this configuration, a description nullifying an internal state description contained in the print data may be included into the conversion result of the state specification data.

That is, the conversion module not only converts state specification data to be expressed in predetermined PDL, but also adds a PDL description nullifying an internal state description contained in the print data. This configuration is useful when the internal state specification contained in the original print data does not match the new state specification data. In other words, the conversion module nullifies the internal state specification in the original print data, thus preventing a conflict.

Another aspect of the present invention is a print control system which comprises a PDL processing module which processes print data described in a predetermined page description language to change its own internal state; input means for receiving from a user an instruction on the internal state of the PDL processing module; and a conversion module which converts the instruction on the internal state, received from the input means, to be expressed in the predetermined page description language and which sends conversion result to the PDL processing module, wherein the PDL processing module processes the conversion result received from the conversion module to specify the internal state.

In this configuration, a user-entered instruction on the internal state of the PDL processing module is converted by the conversion module to a PDL description. The PDL processing module interprets this PDL description to reflect the contents of the instruction on its own internal state.

Another aspect of the present invention is a method of controlling a print control system comprises steps of first extracting state specification data from job data entered from a client unit, the state specification data specifying a internal state of a PDL processing module and being described in a specific data format other than the specific PDL format which the PDL processing module can process; next converting the state specification data, extracted from the job data, to be expressed in the predetermined page description language; and then specifying the internal state of the PDL processing module by causing the PDL processing module to process the conversion result obtained from the converting step.

In this method, when job data entered from the client unit contains both state specification data and print data coded in the predetermined page description language, the PDL processing module may process the conversion result obtained in the conversion step and, after that, PDL processing module may process the print data.

A computer-readable medium according to the present invention has stored thereon a program which causes a computer system to perform the steps of extracting state specification data from job data entered from a client unit, the state specification data being described in a specific data format other than a predetermined PDL format; converting the extracted state specification data to be expressed in the predetermined PDL; and sending conversion result obtained by converting the state specification data to the page description language processing module.

The computer system described above includes various units capable of running programs, such as a printer having a print function, print server controlling such a printer, and print control system. The computer-readable medium on which a program is stored includes any data recording medium capable of storing programs in the computer-readable format, such as a floppy disk, CD-ROM (compact disks read-only memory) disc, a hard disk, or ROM. The program stored on this recording medium is loaded into computer memory for execution by the CPU (central processing unit). A preferred embodiment of the present invention also includes a configuration in which the program is installed onto a computer-connected fixed disk, or loaded into main memory, over a network.

BRIEF DESCRIPTION OF THE DRAWINGS

FIG. 3 shows an example of a DPA data and an example of character strings converted to PDL descriptions.

FIG. 4 shows an example of standard output from a PDL interpreter and the contents of each character string.

DESCRIPTION OF PREFERRED EMBODIMENTS

First Embodiment

Figure 1:
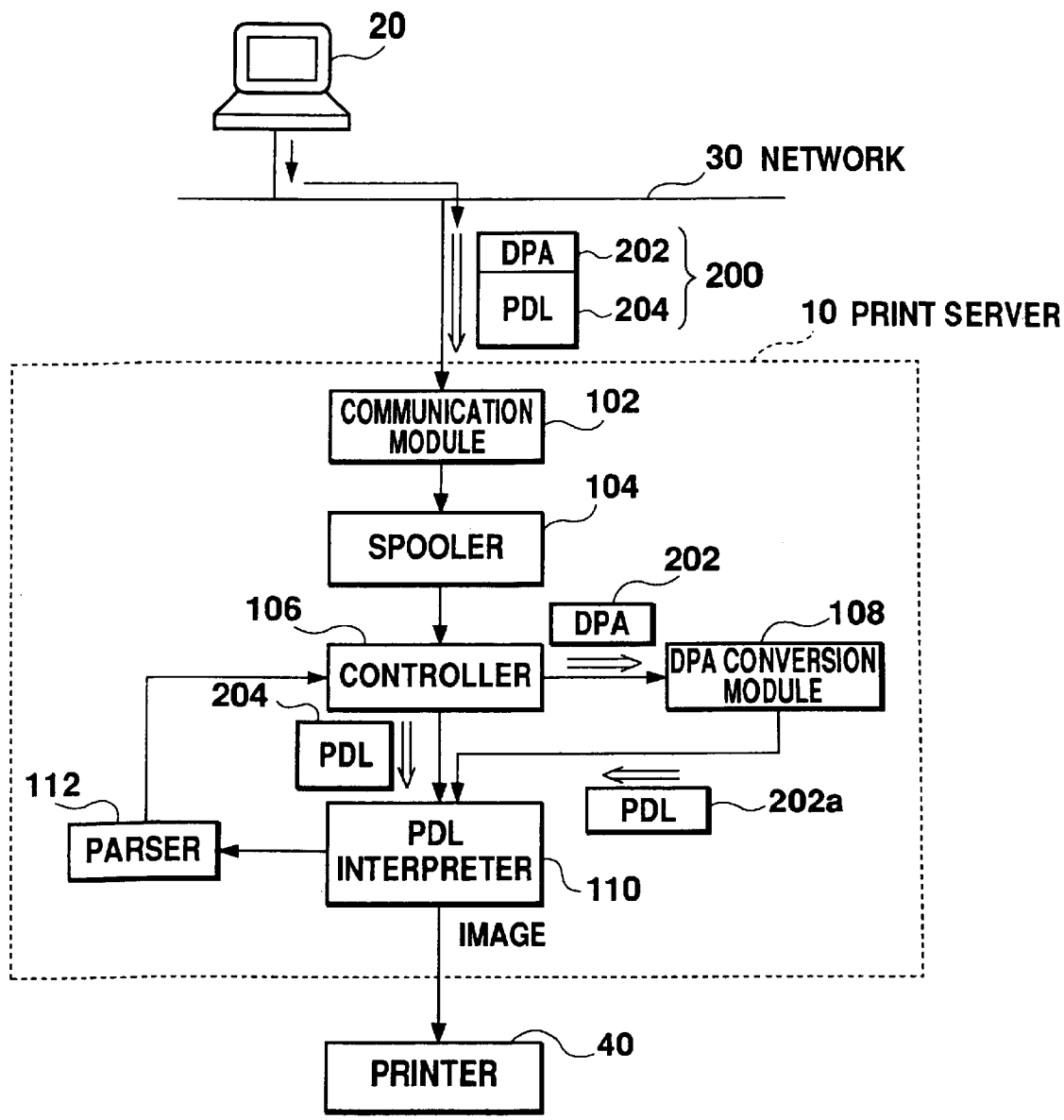
FIG. 1 is a diagram showing an overall configuration of a network print system to which the present invention is applied.

A preferred embodiment of the present invention is described with reference to the drawings. FIG. 1 shows an overall configuration of a network print system according to the present invention.

As shown in FIG. 1, two types of units are connected to a network 30: a print server 10 which works as a printer, and a client unit 20 which is usually a personal computer. The client unit 20 contains a document editing software program as well as a print driver which generates PDL-formatted print data from the data of an edited document. This PDL-formatted print data represents the print image of the document. In the example shown in FIG. 1, the printer driver in the client unit 20 conforms to the DPA (Document Printing Application) to allow a user to code DPA print specification data. The print server 10, usually a computer system, processes print data from the client unit 20 and generates one or more page images for transmission to a printer 40. The printer 40 prints the page images on sheet media such as paper. In FIG. 1, the printer 40 is connected locally to the print server 10; the printer 40 may also be connected remotely to the print server 10 via the network 30.

In the print server 10 a communication module 102, a network interface, receives print data from the client unit 20. Data received by the communication module 102 is sent to a spooler 104 which schedules the processing sequence of received data. The spooler 104, with a storage unit such as a hard disk, stores the received data in the storage unit and then sends it to a controller 106 when it is time to process the received data. The controller 106 divides data received from the spooler 104 into PDL-coded data and non-PDL-coded data. In this embodiment, non-PDL data is DPA data. The controller 106 sends PDL data to a PDL interpreter 110, and DPA data to a DPA converter 108. The PDL interpreter 110 interprets PDL-coded print data and, based on the result, generates page image data in bitmap memory. Generated page image data is sent to the printer 40 for printing. The DPA converter 108 converts DPA-coded data into description expressed in the PDL so that the PDL interpreter 110 can interpret. The converted result is then sent to the PDL interpreter 110.

Also included in the print server 10 is a parser 112 which detects errors in processes of the PDL interpreter 110, as will be detailed below.

Figure 2:
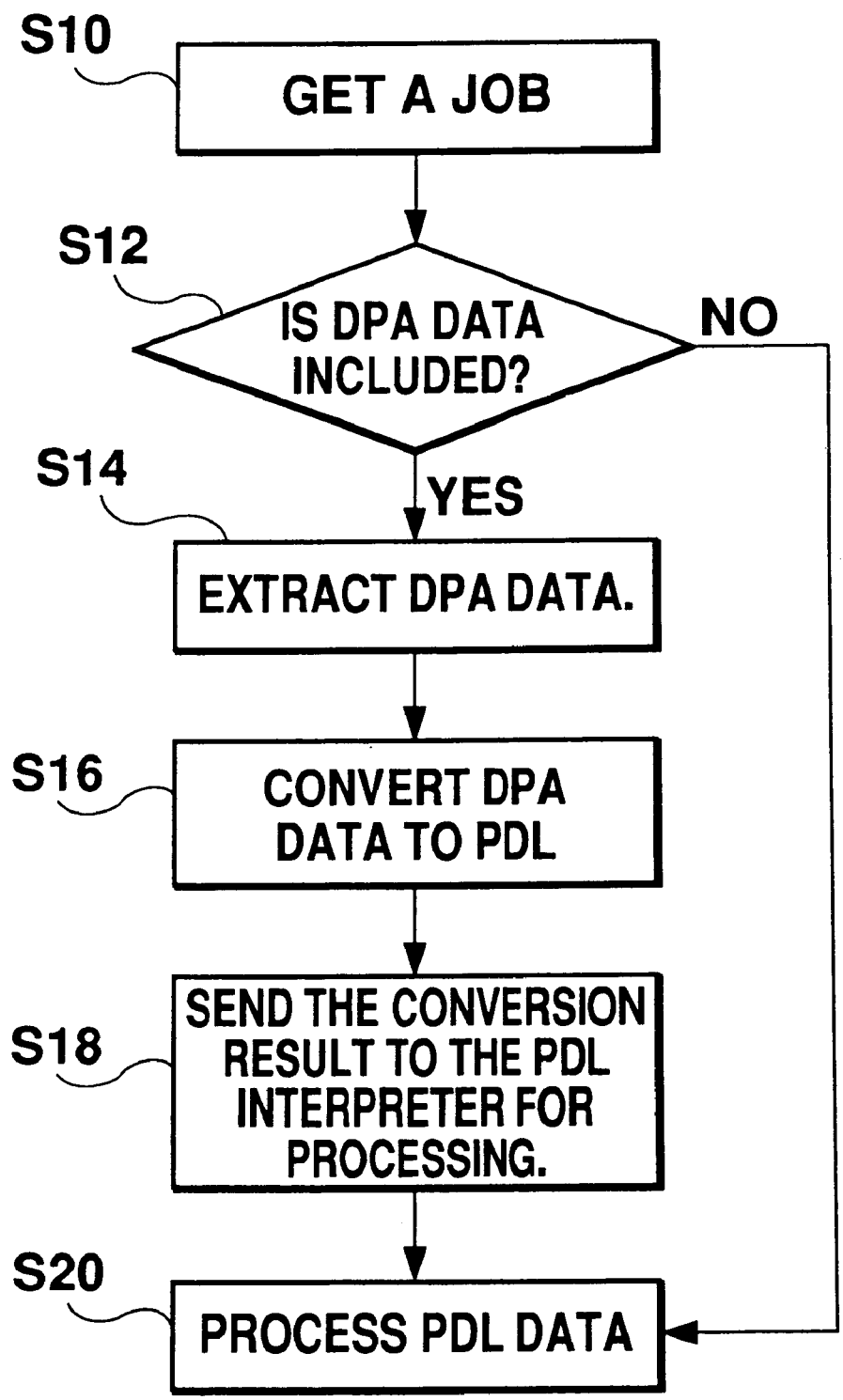
FIG. 2 is a flowchart showing the processing steps of a print server in an embodiment of the present invention.

FIG. 2 is a flowchart showing the operation of the print server 10 shown in FIG. 1 for a job containing both DPA-created print specification data and PDL data. The processing steps of the print server 10 are described with reference to FIGS. 1 and 2.

The user adds new DPA-coded print specification data to already-prepared PDL print data in order to execute a print job for reprinting. Upon receiving the job, the client unit 20 sends to the print server 10 the PDL print data to which DPA-coded print specification data has been added. That is, the client unit 20 sends a job 200 containing both DPA print specification data 202 and PDL print data 204 to the print server 10. The print server 10 receives the job 200 via the communication module 102 and stores it in the storage unit in the spooler 104. The spooler 104 passes the job 200 to the controller 106.

Upon receiving the job 200 from the spooler 104 (S10), the controller 106 ascertains whether or not the job 200 contains DPA data (S12). If the job 200 contains no DPA data, the controller 106 sends the PDL data of the job to the PDL interpreter 110 for interpretation (S20). When, however, the controller 106 finds in S12 that the job 200 contains DPA data, the controller 106 first extracts DPA data from the job 200 and then sends extracted data to the DPA converter 108 (S14). The DPA converter 108, with a table such as a DPA-to-PDL correspondence table, converts the DPA print specification data 202 to a PDL description based on the correspondence table (S16). The PDL-coded print specification data 202a thus obtained is sent to the PDL interpreter 110 for interpretation (S18). As a result, the DPA print specification data 202 is reflected on the internal state of the PDL interpreter 110. Once it has been detected that the PDL interpreter 110 has interpreted all the PDL-coded print specification data 202a, the controller 106 extracts the PDL print data 204 from the job 200 and sends it to the PDL interpreter 110 for processing (S20). As a result, the PDL print data 204 is printed as specified by the DPA print specification data 202.

FIG. 3 shows an example of conversion through the DPA converter 108. Assume that a resolution of 400 dpi (dots per inch) and a paper size of A4 are specified as shown in (a). (Actual DPA data which is binary is not shown here). The DPA data converted to PDL is shown in (b). In this example, the PDL is PostScript. In (b), "setpagedevice" is a PostScript operator for device specification. Executing this operator sets the internal state of the device specifications for the PDL interpreter 110 to a specified value.

In (b), the description preceded by "<<" and followed by ">>setpagedevice" is the converted result. The next line, which is the last line added by the DPA converter 108, contains a description that nullifies the device specification description contained in the PDL data. The setpagedevice operator, if contained in the PDL data, is nullified. Thus, DPA-coded print specification data is used instead of print specification description in the PDL data. Although the setpagedevice operator is nullified on the last line in (b) of FIG. 3, nullification may be specified more flexibly, for example, only for resolution.

Thus, in this embodiment, DPA-coded print specification data may be reflected on the internal state of the PDL interpreter 110 which cannot interpret DPA data. Therefore, even when DPA-coded print specification data is added to PDL data, the print server can process the PDL data according to the added print specification data.

In the above embodiment, the controller 106 divides a job into PDL data and DPA data; this may be done by the communication module 102. Although print specification data is coded in DPA in the above embodiment, the present invention may not only be applied to DPA, but also to any print specification data in any format or language the PDL interpreter cannot interpret. In addition, the present invention may not only be applied to print specification data, but to any specification associated with the internal state of the PDL interpreter.

Next, the parser 112 shown in FIG. 1 will be described. In a conventional print server, even when an error occurs in a PDL interpreter such as the PDL interpreter for use with PostScript, the PDL interpreter returns only a normal termination code to the calling controller. This means that, in a conventional print server where PostScript is used, the user cannot detect an error that may occur during processing in the PDL interpreter. To solve this problem, the parser 112 parses standard output from the PDL interpreter 110 to detect a PDL processing error.

The PDL interpreter for PostScript sequentially outputs character strings, which are messages indicating progress of interpretation process in the interpreter, to the standard output. For error messages, the PDL interpreter sends fixed character strings to the standard output. Printer errors can be identified by finding these fixed character strings. FIG. 4 shows an example of the standard output of the PDL interpreter for PostScript. In FIG. 4, the message shown in (a) is an example of normal output where no error occurred; messages shown in (b) to (d) are those issued when an error occurred. In this embodiment, two types of error are identified: errors that occur during PDL interpretation and errors caused by an interrupt from any of other system modules or from the user. The error code "PDLError" is assigned to the former type of error, while "InterruptError" is assigned to the latter. As shown in FIG. 4, a message in the standard output of the PDL interpreter always beings with "%%[Error:". Therefore, an error may be detected by detecting this character string. To distinguish between an interpretation error and an interrupt error, the character string following "%%[Error:" is used. That is, if the character string "interrupt" follows "%%[Error:", it is determined that an interrupt error occurred; otherwise, it is determined that an interpretation error occurred.

Figure 5:
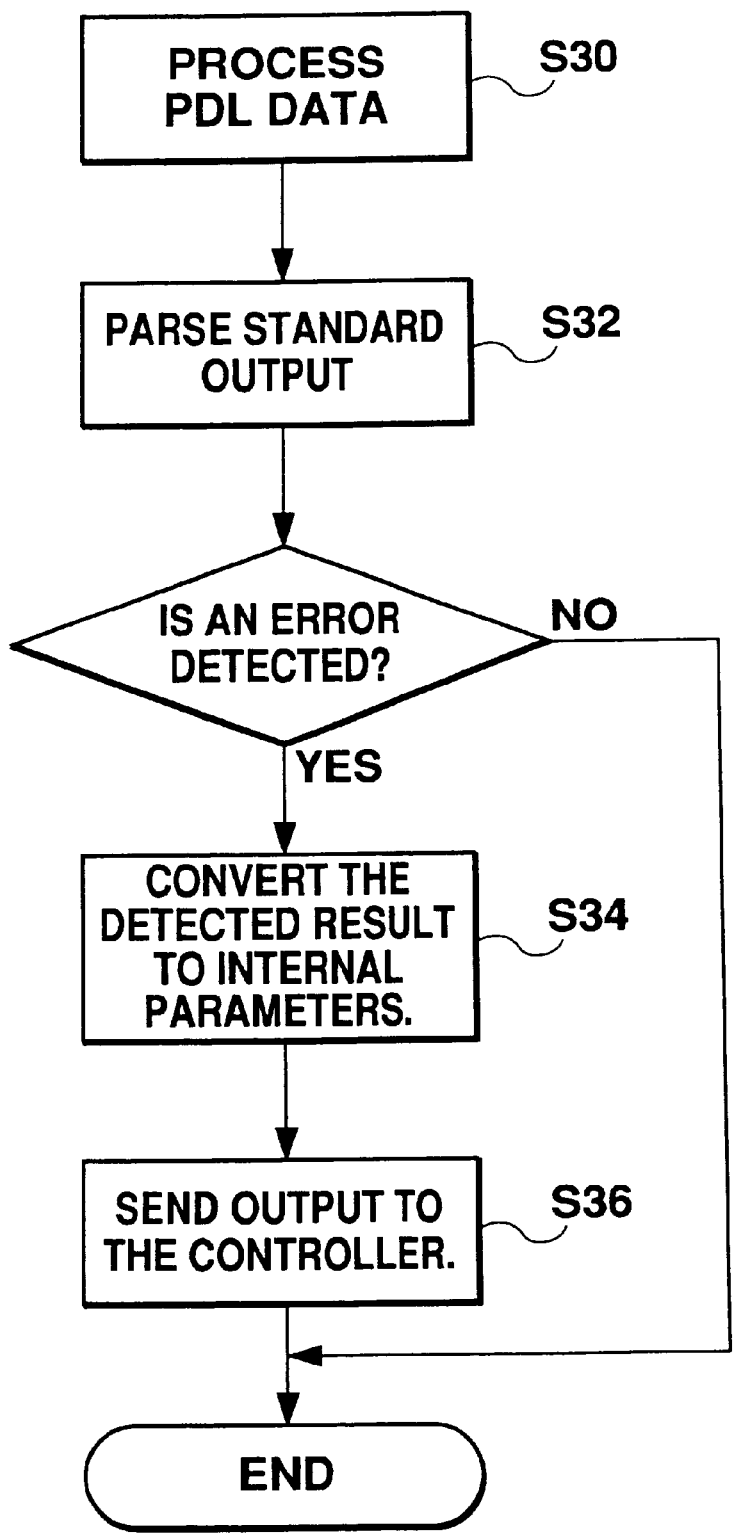
FIG. 5 is a flowchart showing the error detection processing of the PDL interpreter used in the print server used in the embodiment of FIG. 1.

FIG. 5 is a flowchart showing the processing steps for detecting an error. The following description explains error processing with reference to FIGS. 1 and 5.

As PDL data processing proceeds (S30), processing progress messages are output to the standard output of the PDL interpreter 110. The parser 112 parses the standard output of the PDL interpreter 110 to check for the character string, "%%[Error:", which indicates an error (S32). If this character string is not found, the parser 112 performs no operation and waits for the next character string that will be output to the standard output. When the character string "%%[Error:" is found in S32, the parser 112 converts the detection result to a corresponding internal parameters of the print server (S34). That is, the parser 112 parses the character string following the character string "%%[Error:" in order to check the type of error, and outputs internal parameters indicating the type of error. The parser 112 sends the output to the controller 106 (S36). Upon reception, the controller 106 creates a message sheet indicating an error and outputs it on the printer 40, informing the user that an error has occurred in the PDL interpreter. It should be noted that the output from the parser 112 may be sent to the graphic interface of the print server 10 for display on the display screen or that the output may be sent to the client unit 20 via the communication module 102 to display an error message on the display of the client unit 20.

Second Embodiment

In the first embodiment, the internal state data of a PDL interpreter is specified by DPA data sent from a client unit 20. In the second embodiment, the user enters an instruction concerning the internal state of the PDL interpreter from an interface unit on a print server.

Figure 6:
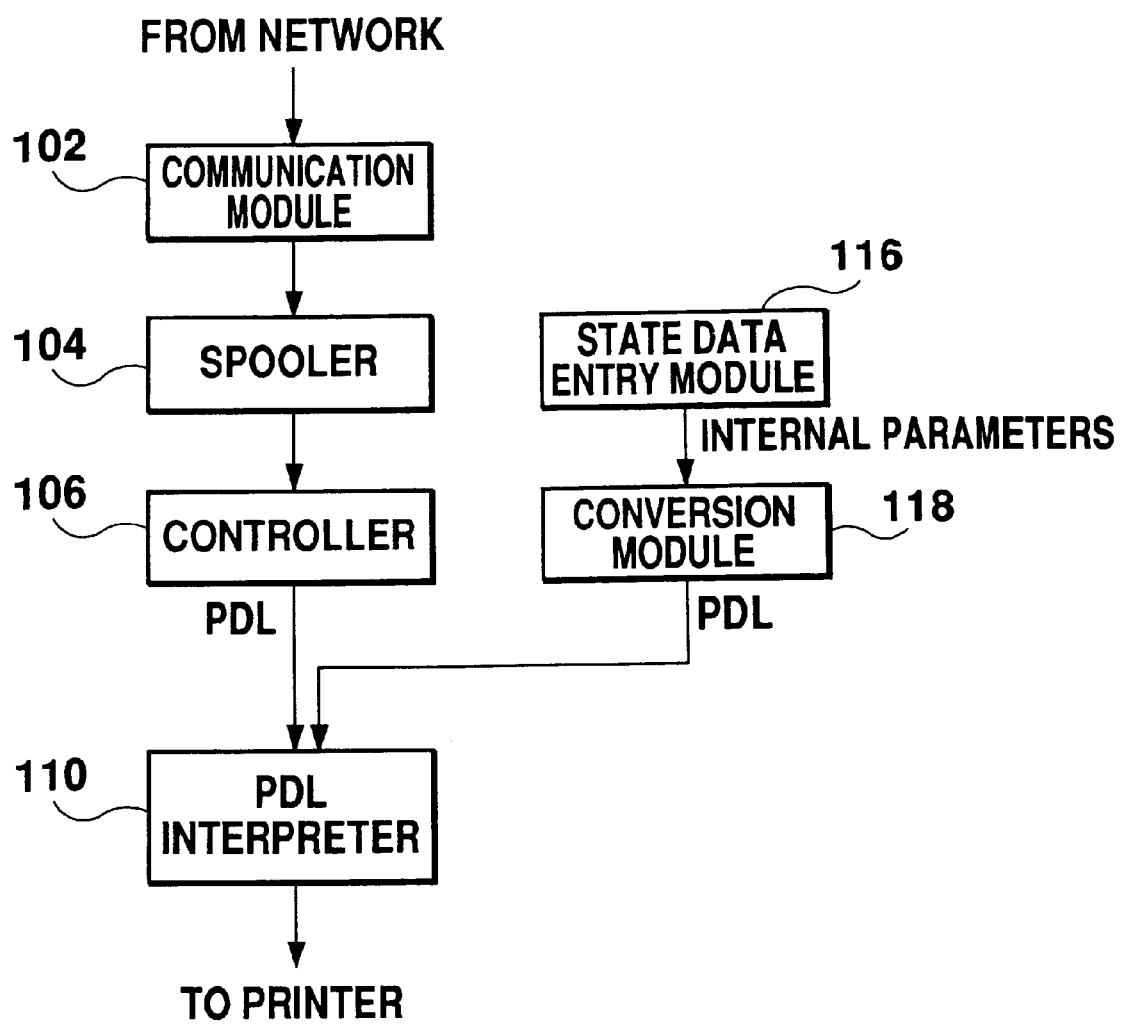
FIG. 6 is a diagram showing another embodiment of a print server according to the present invention.

FIG. 6 shows an overall configuration of a print server used in this embodiment. For a component in FIG. 6 that is already shown in FIG. 1, the corresponding reference number is used and the description of the component is omitted. As shown in FIG. 6, a state data entry module 116 for accepting an instruction about the internal state of the PDL interpreter from the user is provided on the print server. The state data entry module 116 may be implemented, for example, as a GUI component. In this case, the user uses a device such as a mouse or a keyboard to select a state specification button or to fill out a column in order to send an instruction. Input from the state data entry module 116 is sent to a conversion module 118 in the form of print server internal parameters. Using a table containing information about correspondence between internal parameters and PDL descriptions, the conversion module 118 converts internal parameters sent from the state data entry module 116 into PDL data and sends the conversion result to the PDL interpreter 110. The PDL interpreter 110 then interprets PDL data from the conversion module 118 to specify user-specified data for the internal state of the PDL interpreter 110.

In this embodiment, a user instruction entered via the user interface of the print server allows the user to specify the internal state of the PDL interpreter 110.

Figure 7:
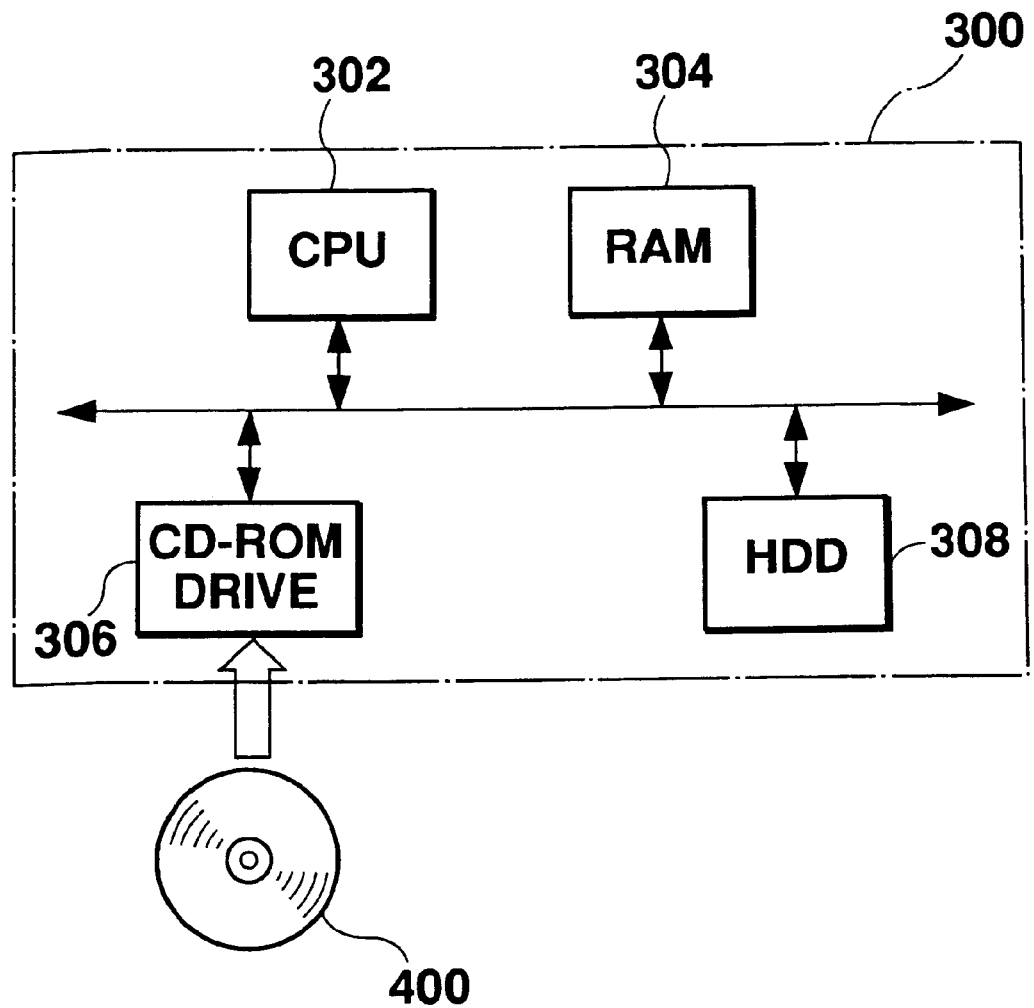
FIG. 7 is a diagram showing the hardware configuration of a computer system in which the present invention is implemented.

The print server 10 described above may be implemented by executing a program, which describes the functions or processing steps of the controller 106, DPA converter 108, and other modules, in a computer system. This program is stored on a computer-readable medium, such as a CD-ROM (compact disc—read only memory) or a floppy disk, for distribution to users. As shown in FIG. 7 a user inserts a CD-ROM 400, containing a program according to the present invention, into a CD-ROM drive 306 of his/her computer system 300. Then, the program, once installed on an HDD (hard disk drive), is ready for execution. This program is loaded into RAM (random access memory) under control of the operating system for execution by the CPU (central processing unit).

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A print control system comprising:
    a PDL (page description language) processing module which has an internal state and which processes print data that includes state specification data and that is described in a predetermined PDL to change said internal state;
    a control module-for extracting the state specification data from the print data entered from a client unit, this state specification data specifying said internal state of said PDL processing module and being described in a predetermined data format other than said predetermined PDL; and
    a conversion module for converting the state specification data, extracted by said control module, from a format that the PDL processing module cannot interpret to a format expressed in said predetermined PDL for transmission to said PDL processing module,
    wherein said PDL processing module interprets and processes the conversion results of said state specification data received from said conversion module to reflect the conversion results on said internal state of said PDL processing module.

2. A print control system according to claim 1, wherein said control module extracts print data described in said predetermined PDL from job data entered from said client unit and, after said PDL processing unit processes said state specification data entered from said conversion module, sends said print data to said PDL processing module.

3. A print control system according to claim 1, wherein said print data may contain specifications for the internal state of said PDL processing module and wherein said conversion module adds to said conversion result of said state specification data a description nullifying specification for the internal state of said PDL processing module in said print data.

4. A print control system according to claim 1, wherein said specific data format is DPA (Document Printing Application).

5. A print control system comprising:
    a PDL processing module which has an internal state and which processes print data and an instruction input from a user on the internal state of the PDL processing module that is described in a predetermined PDL (page description language) to change said internal state;
    input means for receiving from the user the instruction on the internal state of said PDL processing module; and
    a conversion module which converts the instruction on said internal state, received from said input means, from a format that the PDL processing module cannot interpret to a format expressed in said predetermined PDL and which sends the conversion result to said PDL processing module,
    wherein said PDL processing module interprets and processes the conversion result of the instruction received from said conversion module to reflect the conversion result on said internal state of said PDL processing module.

6. A print control system according to claim 5, wherein said print data may contain specifications for the internal state of said PDL processing module and wherein said conversion module adds to said conversion result a description nullify specifications for the internal state of said PDL processing module in said print data.

7. For use in a print control system having a PDL processing module which has an internal state and which processes print data that includes state specification data and that is described in a predetermined PDL (page description language), a method of specifying the internal state of said PDL processing module, comprising the steps of:
    extracting the state specification data from the print data entered from a client unit, this state specification data specifying said internal state of said PDL processing module and being described in a predetermined data format other than said specific PDL format;
    converting the state specification data, extracted from said job data, from a format that the PDL processing module cannot interpret to a format expressed in said predetermined PDL; and
    reflecting the conversion results on the internal state of said PDL processing module by causing said PDL processing module to interpret and process the conversion result obtained from said converting step.

8. A method according to claim 7, wherein, when said job data contains both said state specification data and said print data described in said predetermined PDL, said PDL processing module processes said conversion result obtained in said conversion step and then processes said print data.

9. A method according to claim 7, wherein said print data may contain specifications for the internal state of said PDL processing module and wherein said conversion step includes a step of adding a description nullifying said internal state specification contained in said print data to conversion result obtained by converting said state specification data.

10. A method according to claim 7, wherein said specific data format is DPA (Document Printing Application).

11. A computer-readable medium having stored thereon instructions which when executed by a computer system which has a PDL (page description language) processing module which processes print data that includes state specification data and that is described in a predetermined PDL, cause the computer system to perform the steps of:

extracting the state specification data from the print data entered from a client unit, the state specification data being described in a specific data format other than a predetermined PDL format;

converting said extracted state specification data from a format that the PDL processing module cannot interpret to a format expressed in said predetermined PDL; and sending the conversion result, obtained by converting said state specification data to said PDL processing module which interprets and processes the conversion result to reflect the conversion result on said internal state of said PDL processing module.

12. A computer-readable medium according to claim 11 having stored thereon instructions which cause the computer system to perform further steps of:

extracting printed data described in said predetermined PDL from job data entered from said client unit and, upon detection that said PDL processing module has processed said conversion result obtained by converting said state specification data, sending said print data to said PDL processing unit.

13. A computer-readable medium according to claim 11 having stored thereon instructions which cause the computer system to perform a further step of:

adding a description nullifying internal state specifications contained in said print data to said conversion result obtained by converting said state specification data.

* * * * *